BENJAMIN J. LESLIE.
Improvement in Fly Traps.
No. 118,373.                                        Patented Aug. 22, 1871.
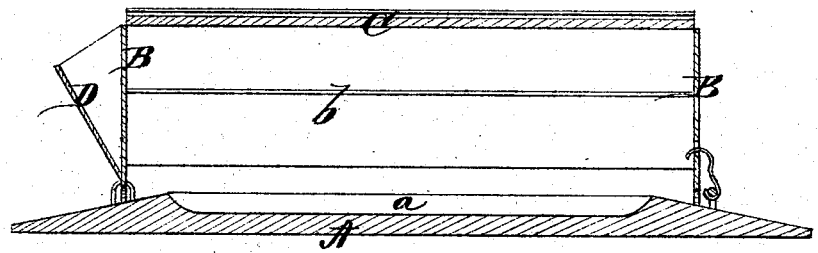
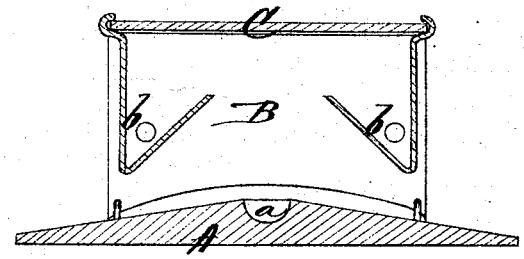

UNITED STATES PATENT OFFICE.

BENJAMIN J. LESLIE, OF IRVINE, KENTUCKY.

IMPROVEMENT IN FLY-TRAPS.

Specification forming part of Letters Patent No. 118,373, dated August 22, 1871.

*To all whom it may concern:*

Be it known that I, BENJAMIN J. LESLIE, of Irvine, in the county of Estill and in the State of Kentucky, have invented certain new and useful Improvements in Fly-Traps; and do hereby declare that the following is a full, clear, and exact description thereof, reference being had to the accompanying drawing and to the letters of reference marked thereon making a part of this specification.

The nature of my invention consists in the construction and arrangement of a fly-trap, as will be hereinafter more fully set forth.

In order to enable others skilled in the art to which my invention appertains to make and use the same, I will now proceed to describe its construction and operation, referring to the annexed drawing, in which—

Figure 1 is a longitudinal vertical section, and Fig. 2 is a transverse vertical section of my fly-trap.

A represents the bed of my fly-trap, provided with a groove or gutter, $a$, in the center. This groove is for the purpose of holding the bait, which may consist of sugar, molasses, or anything else suitable to draw or attract flies to it. B is the trap itself, constructed in any suitable manner so as to cover the groove or gutter $a$, but, at the same time, leave openings at all sides to admit the flies. These openings are at the lower edge of the trap, or, rather, the sides of the trap do not come down close to the bed A except at the corners, thus leaving openings through which the flies may pass into the trap. The trap B is at the top provided with grooves for the insertion of a glass plate, C, and at the end of the trap is a funnel-shaped receiver, D, from which passages or openings lead into gutters $b\ b$ inside of the trap. These gutters are, through the receiver, filled with strong soap-suds.

The flies crawl under the trap for the bait, and, when they rise, pass between the gutters $b\ b$ to the glass, and in trying to make their way through are certain to fall in the suds and drown.

This trap may be made of glass, tin, iron, or any other suitable material.

Having thus fully described my invention, what I claim as new, and desire to secure by Letters Patent, is—

The combination of the trap-box B with its water-gutters $b\ b$, glass top, and apertures at its lower edges, with the bottom A provided with the bait-groove $a$, all substantially as and for the purposes set forth.

In testimony that I claim the foregoing I have hereunto set my hand this 13th day of June, 1871.

BENJAMIN J. LESLIE.

Witnesses:
A. N. MARR,
JAMES M. NITT.